US008448826B2

(12) United States Patent
Lüchinger et al.

(10) Patent No.: US 8,448,826 B2
(45) Date of Patent: May 28, 2013

(54) DOSAGE-DISPENSING UNIT FOR FREE FLOWING SUBSTANCES

(75) Inventors: Paul Lüchinger, Uster (CH); Sandra Ehrbar, Gutenswil (CH)

(73) Assignee: Mettler-Toledo AG, Greifensee (CH)

( * ) Notice: Subject to any disclaimer, the term of this patent is extended or adjusted under 35 U.S.C. 154(b) by 207 days.

(21) Appl. No.: 13/047,223

(22) Filed: Mar. 14, 2011

(65) Prior Publication Data

US 2011/0220686 A1    Sep. 15, 2011

(30) Foreign Application Priority Data

Mar. 15, 2010   (EP) .................................... 10156539

(51) Int. Cl.
     *B67D 3/00*      (2006.01)
     *B67D 7/06*      (2010.01)
     *B65D 47/00*     (2006.01)
     *B65B 1/30*      (2006.01)
     *B65B 3/26*      (2006.01)

(52) U.S. Cl.
USPC ........... 222/507; 222/504; 222/505; 222/561; 141/83

(58) Field of Classification Search
USPC ................. 222/504, 505, 507, 561, 162, 167, 222/168; 141/83
See application file for complete search history.

(56) References Cited

U.S. PATENT DOCUMENTS

| | | | | |
|---|---|---|---|---|
| 1,079,710 A | * | 11/1913 | Mason | 222/507 |
| 1,566,946 A | * | 12/1925 | Witwer | 222/507 |
| 1,789,955 A | * | 1/1931 | Brownson | 222/507 |
| 1,974,348 A | * | 9/1934 | Strehs | 222/507 |
| 2,005,871 A | * | 6/1935 | Remy | 222/507 |
| 2,082,691 A | * | 6/1937 | Farrelly | 141/370 |
| 2,095,042 A | * | 10/1937 | Thorn | 222/507 |
| 2,106,364 A | * | 1/1938 | Thorn | 222/507 |
| 2,108,063 A | * | 2/1938 | Hothersall | 222/507 |
| 2,170,955 A | * | 8/1939 | Thorn | 222/507 |
| 2,193,746 A | * | 3/1940 | Strehs | 222/507 |
| 2,244,071 A | * | 6/1941 | Landrus | 222/83 |
| 2,838,214 A | * | 6/1958 | Kimball | 222/502 |

(Continued)

FOREIGN PATENT DOCUMENTS

| | | |
|---|---|---|
| NL | 9200532 A | 10/1993 |
| WO | WO 9427883 A1 * | 12/1994 |

OTHER PUBLICATIONS

WO9427883 A1—Translations of Abstract and Description.*

*Primary Examiner* — Paul R Durand
*Assistant Examiner* — Vishal Pancholi
(74) *Attorney, Agent, or Firm* — Standley Law Group LLP (57) ABSTRACT

A dosage-dispensing head has a body with an end surface and an area that couples the head to a source container. The end surface has an outlet opening connected to the coupling area. The head also has a slider, constrained to a guided linear sliding movement parallel to the end surface. An aperture-setting member of the body turns about a rotary axis, orthogonal to the end surface, to actuate the slider. An orifice opening of the aperture-setting member is configured so that the outlet opening is always within the area of the orifice opening. A passage opening of the slider is between the body and the aperture-setting member. By turning the aperture-setting member, the slider moves in a linear path, linearly displacing the passage opening relative to the outlet opening and varying the aperture width of the dosage-dispensing head. This regulates the flow rate of the free-flowing dosage material.

16 Claims, 6 Drawing Sheets

U.S. PATENT DOCUMENTS

| | | | |
|---|---|---|---|
| 5,038,839 A * | 8/1991 | Morimoto et al. | 141/83 |
| 5,145,009 A * | 9/1992 | Mheidle et al. | 141/83 |
| 5,242,075 A * | 9/1993 | Ott et al. | 220/361 |
| 7,284,574 B2 | 10/2007 | Fontaine et al. | |
| 7,614,429 B2 | 11/2009 | Pluvinage et al. | |
| 2004/0155069 A1 * | 8/2004 | Fontaine et al. | 222/412 |
| 2006/0011653 A1 * | 1/2006 | Fontaine et al. | 222/181.1 |
| 2007/0006942 A1 * | 1/2007 | Pluvinage et al. | 141/83 |
| 2008/0072993 A1 * | 3/2008 | Luchinger et al. | 141/18 |
| 2009/0078334 A1 * | 3/2009 | Nufer | 141/83 |

\* cited by examiner

ND DISPENSING UNIT FOR FREE
FLOWING SUBSTANCES

CROSS-REFERENCE TO RELATED TO APPLICATIONS

This application is entitled to benefit of a right of priority under 35 USC §119 from European patent application 10156539.8, filed 15 Mar. 2010, the content of which is incorporated by reference as if fully recited herein.

TECHNICAL FIELD

The present invention concerns a dosage-dispensing head as well as a dosage-dispensing unit and a dosage-dispensing device for dosage material in the form of a powder or paste.

BACKGROUND

Dosage-dispensing devices with dosage-dispensing units, which normally include a source container and a dosage-dispensing head, are used in particular in the dispensing of small dosage quantities of, for example, toxic substances with high precision into small target containers. Such target containers are often placed on a balance in order to weigh the substance delivered out of the dosage-dispensing device, so that the substance can subsequently be processed further in accordance with given instructions.

In U.S. Pat. No. 7,284,574 B2 a dosage-dispensing device is described in which a dosage-dispensing unit including a source container and a dosage-dispensing head can be inserted. The dosage-dispensing head contains a basic body which has an end surface and a coupling area for a source container. Further, at the end surface of the basic body, there is an outlet opening arranged which is connected to the coupling area. The outlet opening can be closed off with a rotary slider which is connected to the basic body with the freedom to swivel about the central longitudinal axis of the basic body, wherein said central longitudinal axis is arranged parallel to the end surface. At the end of the rotary slider that is accessible from the outside, there is a cross-slotted aperture-setting member arranged which serves to actuate the rotary slider through engagement with the end of a driving shaft that is shaped like a Phillips screw driver. By turning the rotary slider which is coupled with the driving shaft, the outlet opening can be set free to a variable degree of aperture, so that the dosage material moves through the outlet opening and flows into a target container. As the rotary slider, due to its design, will deflect the outflow path of the dosage material, the latter has to be channeled by a housing part below the outlet opening, in order to also allow the dosage material to be dispensed into target containers with a narrow filler opening.

The dosage-dispensing head of a dosage-dispensing device described in U.S. Pat. No. 7,614,429 B2 contains a basic body which has an end surface and a coupling area for a source container. Further, on one side surface of the basic body there is an outlet opening arranged which is connected to the coupling area. The outlet opening can be covered by a slider which is constrained on the basic body in guided linear sliding movement parallel to the side surface. The actuation of the slider occurs by way of a ring-shaped aperture-setting member to which the slider is mechanically connected. By vertically moving the aperture-setting member, the outlet opening can be set free to a variable degree of aperture, so that the dosage material moves out of the outlet opening. As the outlet opening is arranged on a side surface, the dosage material does not move out vertically and therefore has to be channeled into a target container by means of funnel which is solidly fastened to the dosage dispensing head. Furthermore, the length of the shutter tongue can lead to problems with the tightness of the outlet closure.

The dosage-dispensing devices disclosed in U.S. Pat. No. 7,284,574 B2 and in U.S. Pat. No. 7,614,429 B2 suffer from the drawback that below the slider or the rotary slider the dosage material is guided into the target container by housing parts on which the dosage material can get caught, whereby the accuracy of the results can be compromised. This aspect is especially critical in cases where highly toxic substances are to be measured out and if, for example during the exchange of a dosage-dispensing unit, the remaining particles break loose from the latter and contaminate the ambient work area or the person attending to the apparatus.

This is the reason why the arrangements proposed in the prior art, due to their design layout, are suitable only for dosage material with good free-flow properties, such as liquids, granulates or special powders with particles that are approximately spherical and have a smooth surface, so that as little as possible of the dosage material remains clinging to the equipment.

In addition, the apparatus disclosed in U.S. Pat. No. 7,614,429 B2 involves a complicated and expensive construction and lacks the desired compactness.

The arrangements disclosed in U.S. Pat. No. 7,284,574 B2 are likewise fraught with a similar problem. While the design for the dosage-dispensing head disclosed in FIGS. 2 to 7 of U.S. Pat. No. 7,284,574 B2 can be produced as a compact device at a favorable cost, the mechanical configuration of the dosage-dispensing unit requires a labor-intensive assembly of the drive mechanism, as the dosage-dispensing unit is inserted vertically into the seating socket of the drive mechanism and, in order to be coupled, has to be turned about its vertical lengthwise central axis into the correct position, so that the drive shaft and the rotary slider are aligned with each other. In order to allow the rotary slider to be coupled to the drive shaft after the dosage-dispensing unit has been seated and aligned, it is necessary to move the drive shaft of the drive mechanism in a horizontal direction relative to the rotary slider.

It is therefore the object of this invention to provide a compact, low-cost dosage-dispensing head which allows the dosage material to be delivered with precision in regard to channeling the flow into the filler opening of the target containers and meeting the target quantity, and with safety against contamination, and which is conducive to a simple and cost-effective drive mechanism.

SUMMARY

This task is solved with a dosage-dispensing head according to claim 1, a dosage-dispensing unit according to claim 10, and a dosage-dispensing device according to claim 12.

A dosage-dispensing head includes a basic body which comprises an end surface and a coupling area for a source container or a closure lid. Arranged in the end surface of the basic body is an outlet opening which is connected to the coupling area. The dosage-dispensing head further includes a slider which is constrained on the basic body in guided linear sliding movement parallel to the end surface. For the actuation of the slider, the dosage-dispensing head includes an aperture-setting member arranged on the basic body with the ability to turn about a rotary axis that is orthogonal to the end surface. The aperture-setting member has an orifice opening configured in such a way that, for any position of the aperture-setting member in relation to the basic body, the outlet opening falls within the area of the orifice opening.

The slider, which has a passage opening, is arranged between the basic body and the aperture-setting member. By turning the aperture-setting member in relation to the basic body, the slider can be moved in a linear path relative to the basic body, whereby the aperture width of the dosage-dispensing head can be varied as a result of the displacement of the passage opening relative to the outlet opening and the flow rate of the free-flowing dosage material through the passage opening can be regulated.

In reference to the assembled state of a dosage-dispensing head, the aperture-setting member preferably has an opposing surface arranged next to the end surface of the basic body. A recess in the opposing surface serves to receive the slider. The central axis of the recess runs parallel to, and at a distance from, the axis of rotation.

This opens the possibility for a particularly compact design of the dosage-dispensing head and a simple way of transmitting and converting the rotary movement of the aperture-setting member into a linear movement of the slider. The recess is preferably cylindrical, as this shape is easy to produce and its peripheral contour which, due to the eccentricity of the central axis, functions like a cam disk is suitable for transferring the rotary movement of the aperture-setting member to the slider. It is possible, however, to deviate from this cylindrical shape, for example by choosing a recess which, seen in a cross-section orthogonal to the central axis, has an elliptical shape or is composed of circular segments or even arbitrarily shaped curve segments. With the choice of the contour shape of the recess, the conversion ratio between the linear movement of the slider and the rotary movement of the aperture-setting member can be varied. This makes it possible, with a constant speed of rotation of the aperture-setting member, to achieve a variable speed of the linear movement of the slider over the length of its displacement path.

The basic body can include a first means and the aperture-setting member can include a second means for transmitting a torque. Means which could be considered for this purpose can work by way of contour engagement, such as for example ridges, projections, gripping surfaces for wrenches, recesses and the like. Other means, which work through a force-based engagement, can also be used, for example roughened surfaces, rubber inserts, coatings with especially high coefficients of friction, or similar design elements.

To protect the slider, the aperture-setting member and the basic body from getting destroyed by incorrect handling, there is preferably a rotation-angle-delimiting element arranged between the basic body and the aperture-setting element.

To adapt the dosage-dispensing head to the requirements of the user and/or to the requirements imposed by the dosage material, the passage opening and/or the outlet opening can be a perforation of circular, triangular or square cross-section. Of course, any cross-sectional shapes of the passage opening and/or outlet opening are conceivable, for example if additional requirements such as the selective screening of the maximum grain size are desired.

As a result of the particles of the dosage material moving in relation to each other within the dosage-dispensing unit, the particles can become electrostatically charged and therefore cling to each other or to the aperture-setting member or the slider. Agglomerated dosage material can impede or even block the dosage-dispensing process. Further, dosage material clinging to the aperture-setting member can pollute or contaminate the environment. To avoid this problem, the slider and the aperture-setting member are preferably made of electrically conductive material. The slider can in this case be connected through the aperture-setting member and a continuing electrical path through a suitable connecting means to the ground conductor of the power grid or of a building, whereby electrostatic charges can be carried away. Of course, the basic body can also be made of an electrically conductive material.

As a linear sliding guide, the slider can have a guide strip which slides in a groove of the basic body. As it is difficult to produce precise narrow grooves particularly in parts made of plastic materials, a groove can be formed which is considerably wider than the thickness of the guide strip, wherein at least one partial section of the groove needs to be offset parallel to itself in order to provide a precisely fitting guide for the guide strip. In this arrangement, the offset of the partial section is matched to the thickness of the guide strip and the width of the groove. As an additional benefit of this configuration, the friction resistance in the linear guiding arrangement can be reduced, and jamming of the linear guiding arrangement by dosage material particles can largely be avoided. Of course, one could also use other known kinds of linear guiding arrangements.

As a means to reduce the friction forces even further, the end surface can include a raised dam encircling the outlet opening. Thus, the slider rests only against this dam. Further, a sealing lip surrounding the outlet opening can be formed on the dam in order to minimize the possibility that dosage material could enter in between the end surface and the opposing surface. The dimensions of the basic body, of the aperture-setting member and of the slider are matched to each other in such a way that, in the assembled condition, the slider is pressed slightly against the sealing lip.

Of course, the linear movement of the slider could also be guided from the side of the aperture-setting member, and the cylindrical recess could be a setback from the end surface of the basic body.

As has already been described in the introduction, a dosage-dispensing unit includes at least one dosage-dispensing head and at least one source container connected to at least one coupling area, or a closure lid. To get a dosage-dispensing unit ready to operate, the dosage material is filled into the source container and the latter is closed with a dispensing head. In the case of very small quantities, the dosage material can of course also be filled into the dosage-dispensing head and the coupling area can be closed with a closure lid. With the slider in the closed position, the filled dosage-dispensing unit can be stocked as a storage container until it is being used. If the storage conditions have to meet higher standards, the aperture-setting member of the dosage-dispensing head can be enclosed with a cap whose rim preferably reaches over the basic body.

However, it is not absolutely necessary for the dosage-dispensing unit to have a closure lid or a source container. A dosage-dispensing unit can also consist of a dosage-dispensing head according to the invention that is equipped with at least one supply feeder device connected to the coupling area. Such a supply feeder device can for example be a silo, a tank or a funnel.

The dosage-dispensing units described above can be set into a dosage-dispensing device. A dosage-dispensing device includes a base unit and, arranged on the latter, at least one receiving device to hold at least one dosage-dispensing unit and at least one drive mechanism. As described above, the basic body includes a first means and the aperture-setting member includes a second means for transmitting a torque. The receiving device further includes a first unit corresponding to the first means, and the drive mechanism includes a second unit corresponding to the second means. The first unit and the second unit are parts of a system which on the one hand supports the weight of the dosage-dispensing unit and on the other hand serves to transfer a rotary movement and to take up the torque introduced by the rotary movement, wherein the functions of supporting, moving, and taking up the torque can be arbitrarily divided up between the first and the second unit.

The receiving device can be pivotally supported on the base unit so that it can tilt about a horizontal tilt axis. The advantage is that the dosage-dispensing unit can be conveniently set into its place and the position of the slider can be checked at the same time. The tilting mechanism can further be used for the purpose of loosening the dosage material contained in the dosage-dispensing unit by tilting the latter back and forth one or more times. The loosening process can be further helped by vibrations acting on the receiving device. Dosage-dispensing units are normally stored in a holder device, for example a rack, with the dosage-dispensing head facing upward. "Facing upward" in this context means that the dosage-dispensing head faces with its outlet opening against the direction of gravity. There are good reasons for this storage arrangement, as some pulverous substances which can be filled into dosage-dispensing units can over the time of their storage clot together into lumps. These lumps can block or even destroy the slider. If the dosage-dispensing device is used in an automated environment, the tiltable receiving device further offers the possibility that a robot arm can accept the dosage-dispensing unit in the orientation with the outlet opening facing upward, without the robotic gripper first having to turn the dosage-dispensing unit upside down.

There are three ways in which the drive mechanism can act on the dosage-dispensing unit. For example, the first unit can be arranged so that it can rotate on the receiving device while being connected to the drive mechanism, and the second unit can serve to hold the dosage-dispensing unit and to take up the torque during the dosage-dispensing process.

As an alternative, the first unit can be rigidly connected to the receiving device and serve to hold the dosage-dispensing unit and take up the torque during the dosage-dispensing process, while the second unit is rotatably connected to the drive mechanism. Of course, the drive mechanism can also act on the first and the second unit in which case, logically, there has to be a state of relative movement between the first and the second unit in order for an opening- or closing process to take place.

The first and the second unit can be a clamping device or a form-fitting holder device which in each case can be rigidly connected, respectively, to the basic body and the aperture-setting member.

In a further configuration, the first unit and the first means of the dosage-dispensing unit as well as the second unit and the second means of the dosage-dispensing unit can be matched to each other, respectively, for a form-fitting mutual engagement, wherein the two form-fitting matches are designed so that when the dosage-dispensing unit is completely installed, there is only one position, respectively, for the basic body to take in relation to the first unit and for the aperture-setting member to take in relation to the second unit.

With this lock-and-key relationship between the first unit and the basic body as well as between the second unit and the aperture-setting member, a dosage-dispensing unit set into the first unit in an arbitrary position with regard to the angular offset of the first and second means relative to the first and second units can be aligned precisely and securely by simply turning the dosage-dispensing unit in the locking direction by means of the drive mechanism.

BRIEF DESCRIPTION OF THE DRAWINGS

The dosage-dispensing head and the dosage-dispensing unit will hereinafter be explained in more detail through examples and with references to the drawings, wherein.

DETAILED DESCRIPTION

Figure 1:
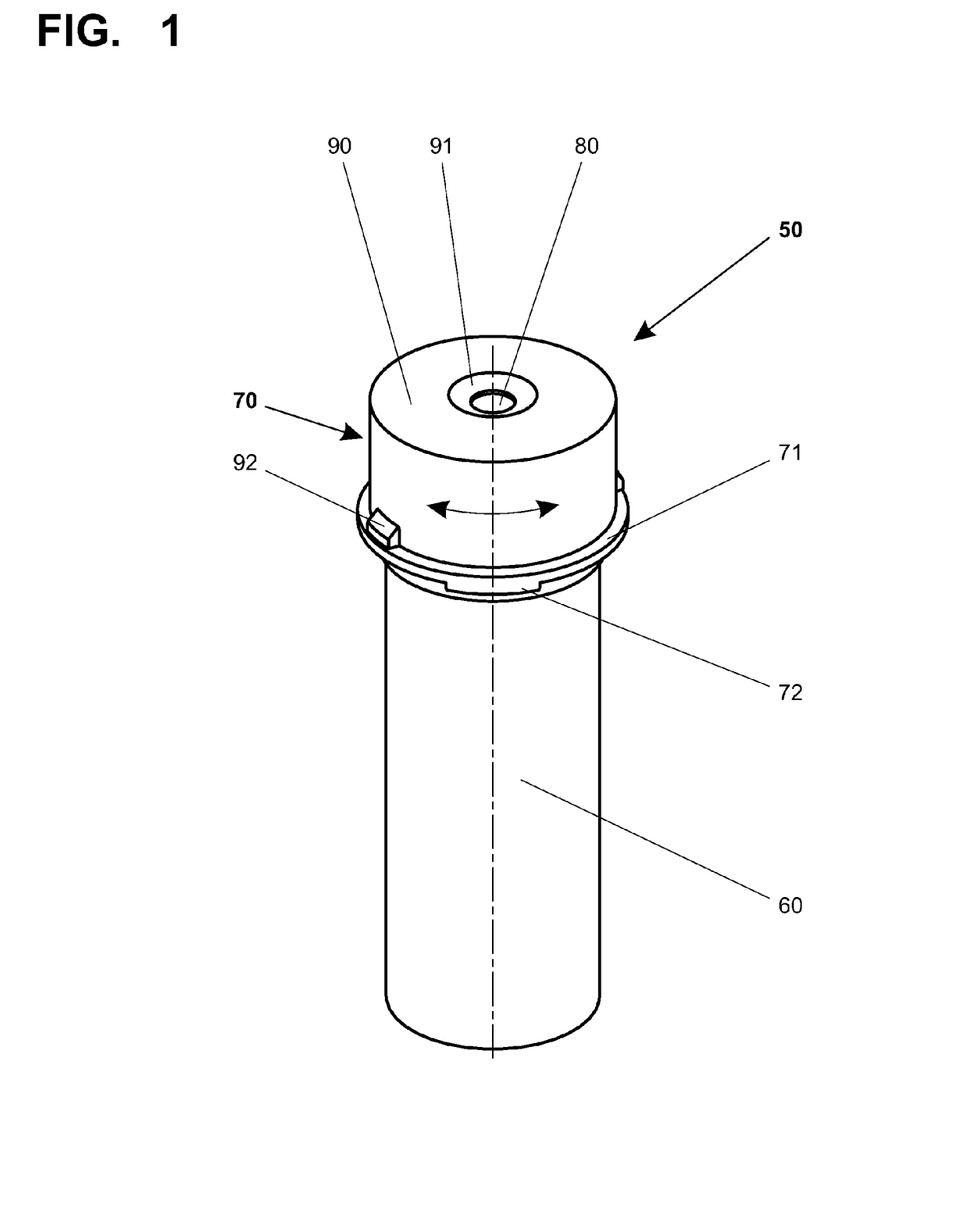
FIG. 1 is a perspective view of a dosage-dispensing unit with a dosage-dispensing head in a three-dimensional view.

FIG. 1 illustrates in a three-dimensional view a dosage-dispensing unit 50 with a dosage-dispensing head 70 according to the invention. The dosage-dispensing unit 50 is shown in its setup position, i.e. the position in which the source container 60 is joined to the dosage-dispensing head. To allow dosage material to flow out of the dosage-dispensing head 70, the dosage-dispensing unit 50 has to be turned upside down, so that the dosage-dispensing head 70 is at the bottom and the source container 60 is at the top. The dosage-dispensing head 70 includes a basic body 71 (visible only in part), to which the source container 60 is releasably connected. The place of the source container 60 can also be taken by a closure lid, so that a filled and ready-to-use dosage-dispensing head 70 holds at the same time the supply of dosage material. Furthermore, it is also possible to connect other supply feeder devices to the basic body 71, for example a funnel, a tank, a silo or a feeder hose. The basic body 71 further includes a first means 72 for transmitting a torque. Of course, the first means 72 does not necessarily have to be configured with the projection shown in FIG. 1 in order to allow a form-fitting engagement with a first unit (not shown). As a first means 72, the basic body 71 can also have a clamping surface which can be connected to the first unit through a force-based engagement, for example with a clamping claw or a collet. The basic body 71 is almost completely enclosed by a cup-shaped aperture-setting member 90 which is rotatably connected to the basic body 71. The aperture-setting device 90 has at its end surface an orifice opening 91 through which a small part of a slider 80 is visible. The slider 80 is shown in its closed position, which is why the passage opening of the slider 80 is covered up by the aperture-setting member 90. However, this is not strictly required; the orifice opening 91 can also be selected large enough that the passage opening of the slider 80 remains always visible. Like the basic body 71, the aperture-setting member 90 includes a second means 92 serving to transmit a torque.

Figure 2:
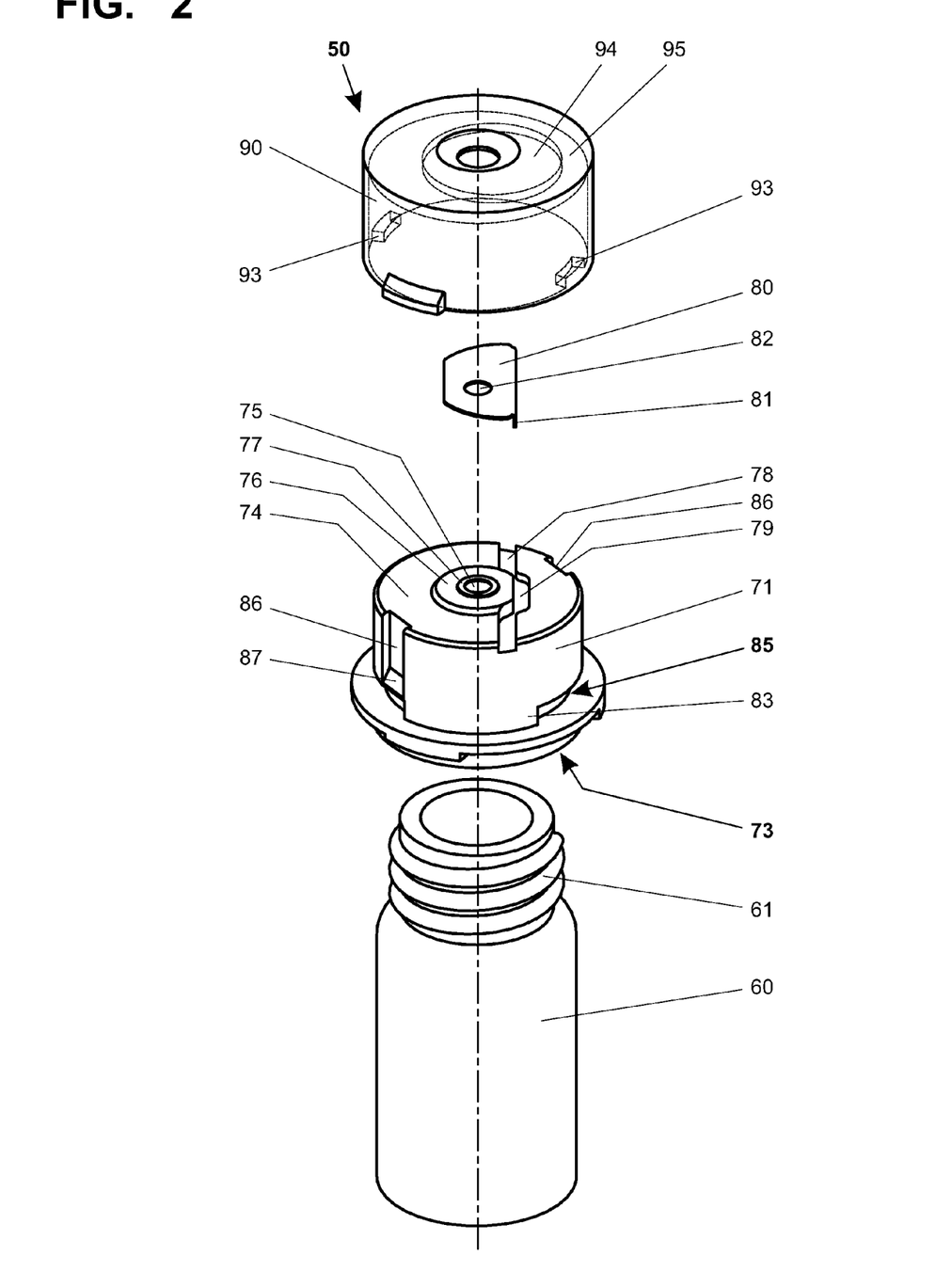
FIG. 2 is an exploded perspective view of the FIG. 1 dosage-dispensing unit.

FIG. 2 shows the dosage-dispensing unit 50 of FIG. 1 in a three-dimensional exploded view. All of the features that were already covered in the description of FIG. 1 keep the same reference symbols in FIG. 2.

The source container 60 has a connector thread 61 which can be screwed into a connector area 73 (not visible) of the basic body 71. The fundamental shape of the basic body 71 is cylindrical. Arranged in its end surface 74 is an outlet opening 75 which lies on the central longitudinal axis of the basic body 71. The outlet opening 75 is connected to the connector area 73 so that when the dosage-dispensing unit 50 is in its operating state, dosage material can move from the source container 60 to the outlet opening 75. Furthermore, a raised dam 76 encircling the outlet opening 75 protrudes from the end surface 74. The dam 76 additionally includes a sealing lip 77 encircling the outlet opening 75.

There is further a groove 78 formed on the basic body 71. The groove is recessed into the end surface 74, at a distance from the central longitudinal axis so as not to interfere with the outlet opening 75 and the sealing lip 77. As shown, the mid-section 79 of the groove 78 can be laterally offset. This feature has on the one hand technical advantages in the manufacturing process, because a more precise sliding guide can thereby be created for the slider 80. On the other hand, it can also lead to a reduction of the friction resistance in the guided movement of the slider 80.

The slider 80 is essentially a flat part which is bent at a right angle along one side, so that the angled border forms a guide strip 81. In the assembled state of the dosage-dispensing head 70 the guide strip 81 reaches into the groove 78, so that the groove and the guide strip together form a linear guiding constraint for the slider 80. Furthermore, a passage opening 82, shown in FIG. 2 as a round hole, is formed in the slider 80. Of course, the passage opening 82 can have any desired shape, for example triangular, rectangular, square or oval. As described in detail in U.S. Pat. No. 7,284,574 B2, the triangular shape is particularly well suited, as it allows the outlet aperture profile of the dosage-dispensing head 70 to be adjusted to the diameter of an individual particle of the dosage material by shifting the slider 80 and its passage opening 82 relative to the outlet opening 75. Accordingly, it is not only possible to dispense a variably adjustable stream of dosage material from the dosage-dispensing unit, but also individual particles.

For better clarity, the inside contours of the aperture-setting member 90, as far as they are essential for the functioning of the device, are drawn in broken lines, in particular the opposing surface 95 of the aperture-setting member 90 and a cylindrical recess 94 which is set back from the opposing surface 95 and serves to receive the slider 80.

To prevent the slider 80 from getting destroyed, there has to be a feature that limits the angular range of the rotary movement between the basic body 71 and the aperture-setting member 90. A limit stop 83 is therefore formed on the basic body 71, cooperating with two opposing stops 93 that are formed on the inside of the aperture-setting member 90. The opposing stops 93 glide in a retaining groove 85 formed on the basic body 71, so that the aperture-setting member 90 is held captive in the direction of the central longitudinal axis. To allow the aperture-setting member 90 to be connected to the basic body 71 or, more specifically, to be slipped over the basic body 71, there are two channels 86 recessed into the cylindrical side wall of the basic body 71, with spring-loaded catches 87 over which the opposing stops 93 can be pushed down into the retaining groove. The two opposing stops 93 and associated channels 86 can have different widths, so that the aperture-setting member can be connected to the basic body 71 only in one specific position.

Figure 3:
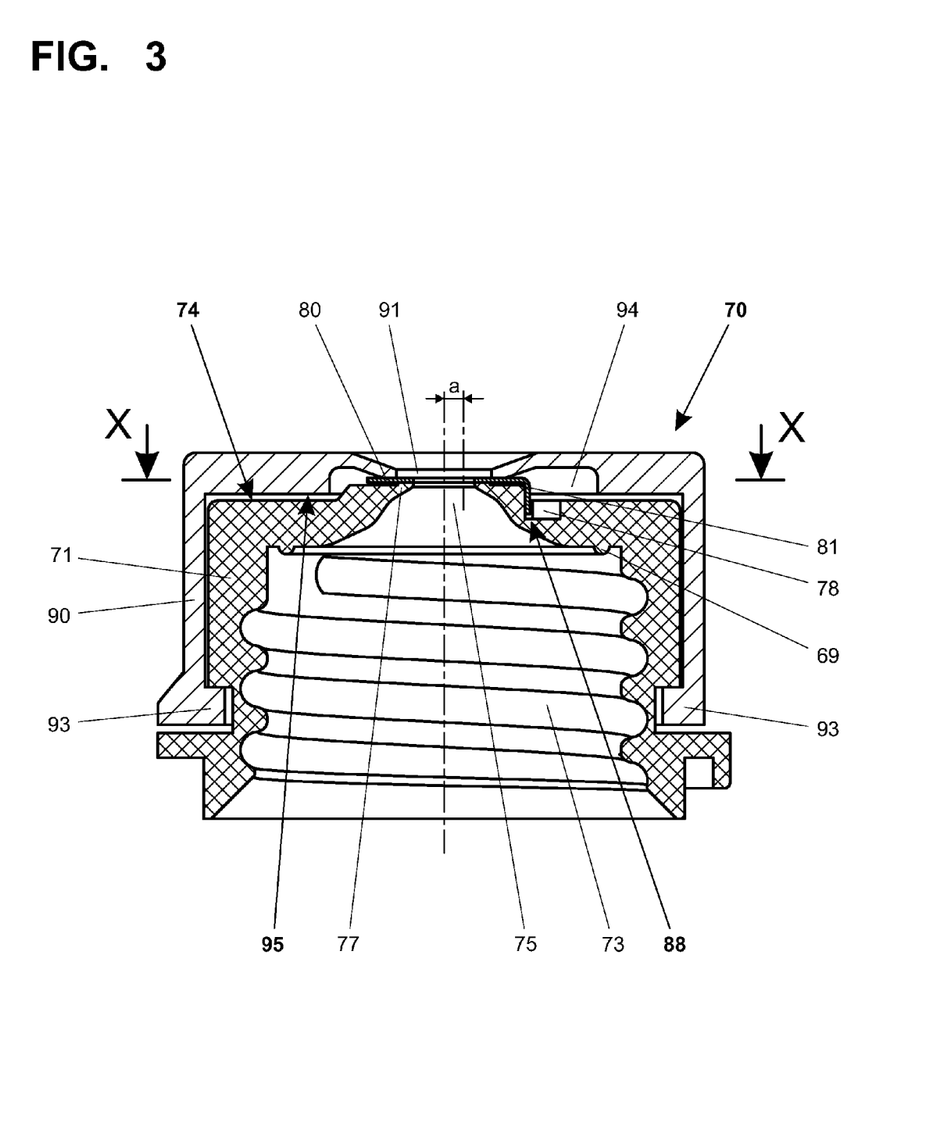
FIG. 3 is a side sectional view of the FIG. 1 dosage-dispensing head.

FIG. 3 shows the assembled dosage-dispensing head 70 of FIGS. 1 and 2 in a sectional, sideways-directed view. The sectional representation illustrates the connection within the basic body 71 between the connector area 73 and the outlet opening 75. It is further apparent that the orifice opening 91 of the aperture-setting member 90 is significantly larger than the diameter of the outlet opening 75. This prevents the possibility that dosage material could cling to the rim of the orifice 91. Some of the pulverous substances that can be filled as dosage material into the dosage-dispensing unit 50 have a tendency to become electrostatically charged as a result of the flow movements inside the dosage-dispensing head 70. This can have the consequence that the dosage material clings to the slider 80 and to the aperture-setting member 90. As a countermeasure, the aperture-setting member 90 and the slider 80 are preferably made of an electrically conductive material, so that these parts can be grounded and electrostatic charges can be drained off.

FIG. 3 further illustrates the arrangement of the slider 80 between the basic body 71 and the aperture-setting member 90. In the assembled state of the device, the opposing surface 95 of the aperture setting member 90 is arranged next to the end surface 74 of the basic body 71. Set back from the plane of the opposing surface 95 is the cylindrical recess 94 which serves to receive the slider 80. The central longitudinal axis of the cylindrical recess 94 is offset by the distance a from the central longitudinal axis of the dosage-dispensing head 70. In the cylindrical recess, the slider 80 is arranged lying against the sealing lip 77. The bent-off guide strip 81 of the slider 80 reaches into the groove 78 and thereby forms a linear sliding guide 88. The dimensions of the aperture-setting member 90, in particular the distance between the opposing stops 93 and the opposing surface 95 are matched to the thickness of the slider 80 and the dimensions of the basic body 71 in such a way that the slider 80 is held under a slight pressure against the sealing lip 77. In order to achieve a defined amount of compressive force, the portion of the aperture-setting member 90 around the orifice 91 is shaped like a diaphragm spring.

To achieve an adequate seal between the source container and the basic body 71, a seal ring 69 can be formed or inserted in the connector area 73.

Figure 4A:
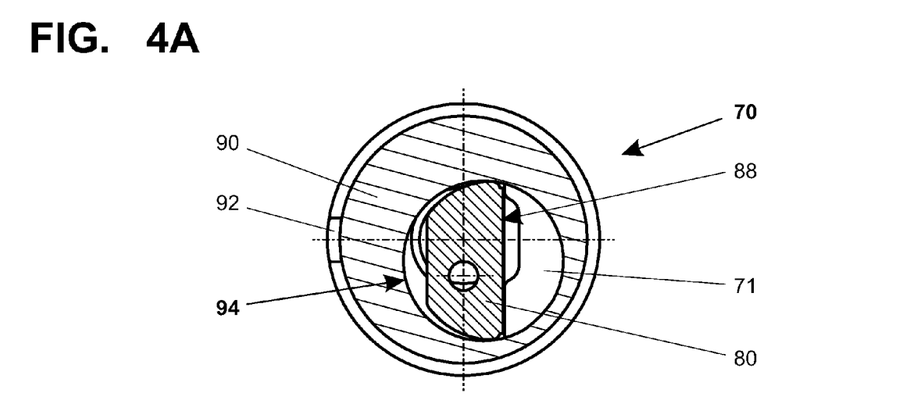
FIGS. 4A through 4C show the dosage-dispensing head according to the invention in a sectional view in the plane shown in FIG. 3 as X-X, with FIG. 4A showing the slider in a closed position, completely covering the outlet opening, with FIG. 4B showing the slider in an intermediate position, partially covering the outlet opening, and with FIG. 4C showing the slider in its open position, setting the outlet opening completely free.
Figure 4B:
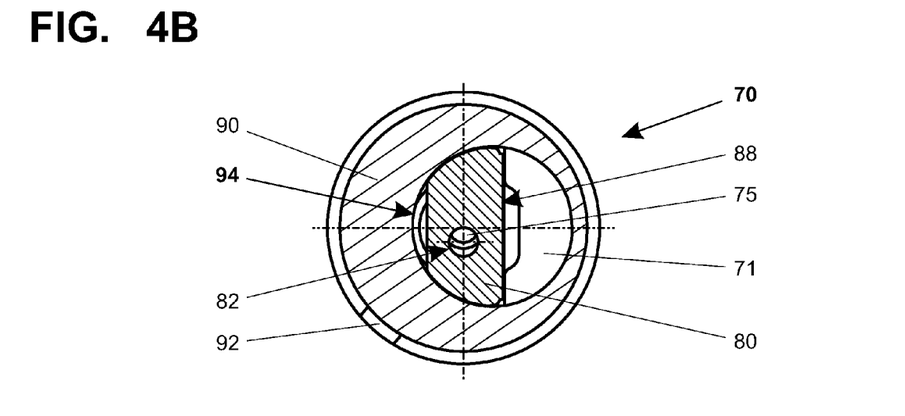
Figure 4C:
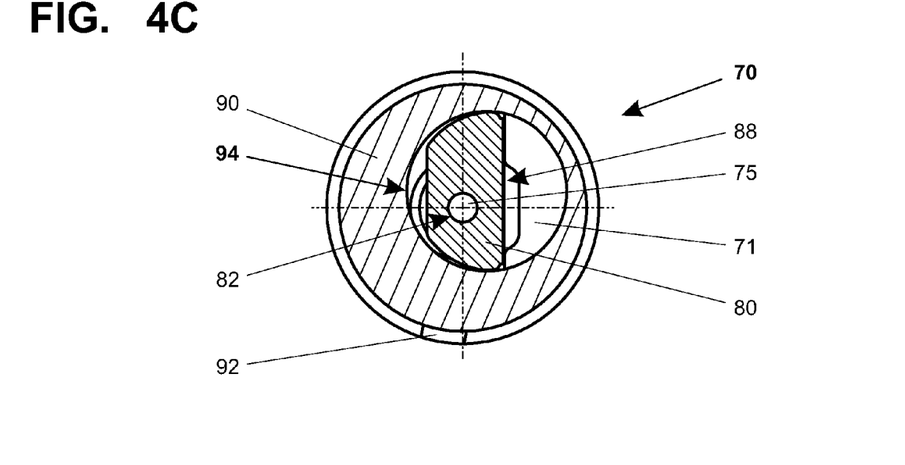

In the next-following drawing, FIGS. 4A to 4C illustrate the movement of the slider 80 as well as the functions of the cylindrical recess 94 and the linear sliding guide 88 in more detail. FIGS. 4A to 4C show the dosage-dispensing head 70 according to the invention in a sectional view in the sectional plane indicated in FIG. 3 as X-X, wherein the slider 80 is shown in different positions. The respective positions of the aperture-setting member 90 in relation to the stationary basic body 71 are made evident by the positions of the second means 92.

FIG. 4A shows the slider 80 in its closed position. It appears that in this position the surface contour of the slider 80 does not quite conform to the cylindrical recess 94. The reason for this is that the slider 80 can move only in the direction dictated by the linear sliding guide 88, while the cylindrical recess 94 moves in a circle about the central longitudinal axis of the dosage-dispensing head 70.

FIG. 4B shows the slider 80 in an intermediate position, i.e. a position where the slider 80 covers part of the outlet opening 75. The aperture area that is set free in this position is about one-third as large as the cross-sectional area of the outlet opening 75. Thus, the relationship between the variation of the aperture area and the angle of rotation of the aperture-setting member 90 is a non-linear function.

If the change of the aperture area is to follow a given specific function dependent on the position of the slider 80 relative to the outlet opening 75, it will be necessary to adapt the shape of the passage opening 82 and/or the outlet opening 75 to this requirement. Any arbitrary shape of the opening could be considered here, in particular triangular, oval, rectangular and crescent-shaped.

As is further evident from FIG. 4B, in this slider position the contour of the slider 80 conforms exactly to the cylindrical recess 94.

FIG. 4C shows the slider 80 in the open position, where the outlet opening 75 is set completely free by the passage opening 82 of the slider 80. In this position, too, it appears that, for the same reason as in FIG. 4A, the contour of the slider 80 does not quite match up with the circumference of the cylindrical recess 94.

In the description of the embodiments and in the drawing figures, the shape of the recess 94 in which the slider is arranged referred to as cylindrical. However, it is also possible to deviate from the cylindrical shape, for example with a cross-sectional profile of the recess 94 in a plane orthogonal to the axis of rotation which is only composed of segments of circles or even has an elliptical shape. By giving the recess a specific shape it is possible to influence the conversion ratio between the linear movement of the slider and the rotary movement of the aperture-setting member.

Figure 5:
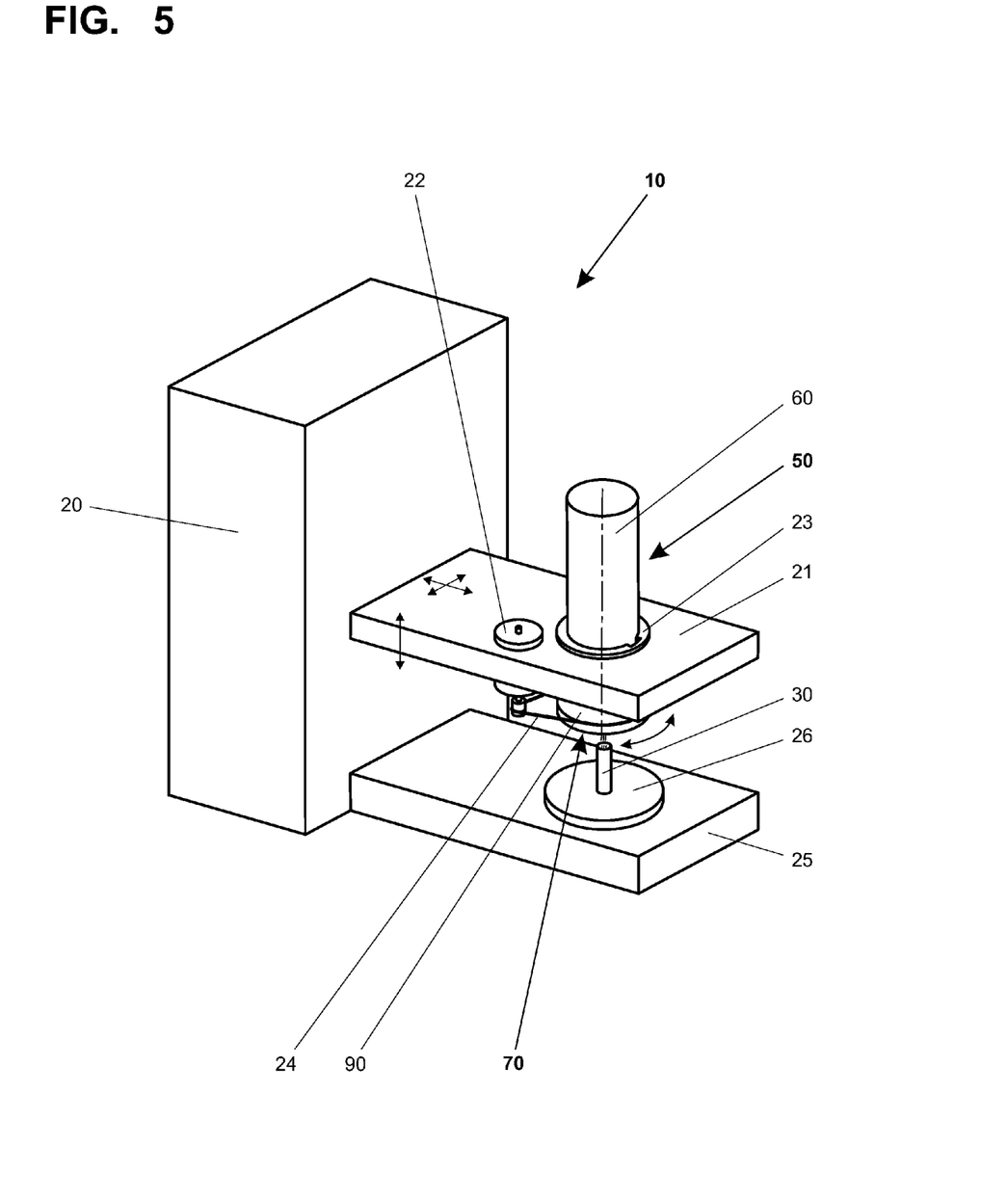
FIG. 5 is a schematic perspective view of a dosage-dispensing device with a dosage-dispensing unit, a receiving device and a drive mechanism, further with a balance including a weighing cell to measure the quantity of dosage material dispensed.

FIG. 5 represents in a schematic three-dimensional view a dosage-dispensing device 10 which has a base unit 20. Connected to the base unit 20 are a receiving device 21 and a drive mechanism 22 as well as a balance 25 which serves to measure the quantity of dosage material dispensed. The base unit can be a simple rigid frame, but it can also include additional elements, for example a processor unit to control and regulate the dosage-dispensing process, an output unit to display the result, an input unit for manual entries, a communication module providing the connection to a higher-level process-control system, and other elements of this kind. The arrangement can further include vibration-producing devices which increase the discharge rate of dosage material by generating short-stroke oscillatory movements of the receiving device 21 as indicated by the double arrows in the drawing.

The receiving device 21 includes a first unit 23 which is configured so that a dosage-dispensing unit 50 can be held in the receiving device 21 and a torque acting on the dosage-dispensing unit can be taken up. The first unit 23 is preferably a clamping device or a form-fitting holder which can be rigidly connected to the basic body (the latter being invisible in this drawing). The torque that needs to be taken up is generated by the driving device 22 and transmitted to the aperture-setting member 90 of the dosage-dispensing unit 50 by means of a second unit 24 which in this example is configured as a friction-based belt drive. Of course, one could also envision transfer elements with a form-fitting engagement, for example gears, levers, cam disks, box wrenches, open-ended wrenches and the like.

The balance 25, specifically its load receiver 26, is arranged below the dosage-dispensing unit 50. A target container 30 can be set on the load receiver 26, to receive the dosage material being dispensed. The balance 25 is preferably connected to the processor unit of the dosage-dispensing device 10 by way of communication means, so that the weight values that are continuously registered by the balance 25 can be worked up in the processor unit and used for the control of the dosage-dispensing process.

A dosage-dispensing process can have the following steps:
a source container 60 filled with dosage material is joined to a dosage dispensing head 70 according to the invention to form a dosage-dispensing unit 50 in accordance with FIG. 1;
the dosage-dispensing unit 50, specifically its basic body 71, is firmly connected to the receiving device 21 by means of the first unit 23 shown in FIG. 5;
an empty target container 30 is placed on the load receiver 26, the tare weight of the target container is registered and transmitted to the processor unit;
the aperture-setting member 90 of the dosage-dispensing unit 50 is connected to the drive mechanism 22 by means of the second unit 24;
by way of an input unit (not shown in the drawing) the quantity of dosage material to be dispensed is entered into the processor unit of the dosage-dispensing device 10;
by activating the drive mechanism 22, the aperture-setting member 90 is turned, the slider (not visible in the drawing) is moved along a linear path, and the outlet opening of the dosage-dispensing unit 50 is set free;
the quantity of dosage material dispensed into the target container 30 is continuously or sequentially registered by the balance 25, the weight values are transmitted to the processor unit until the weight value equals the desired end quantity of dosage-material, and in response to a command of the processor unit, the drive mechanism 22 turns the aperture-setting member 90 in the opposite direction and closes the outlet opening.

Figure 6:
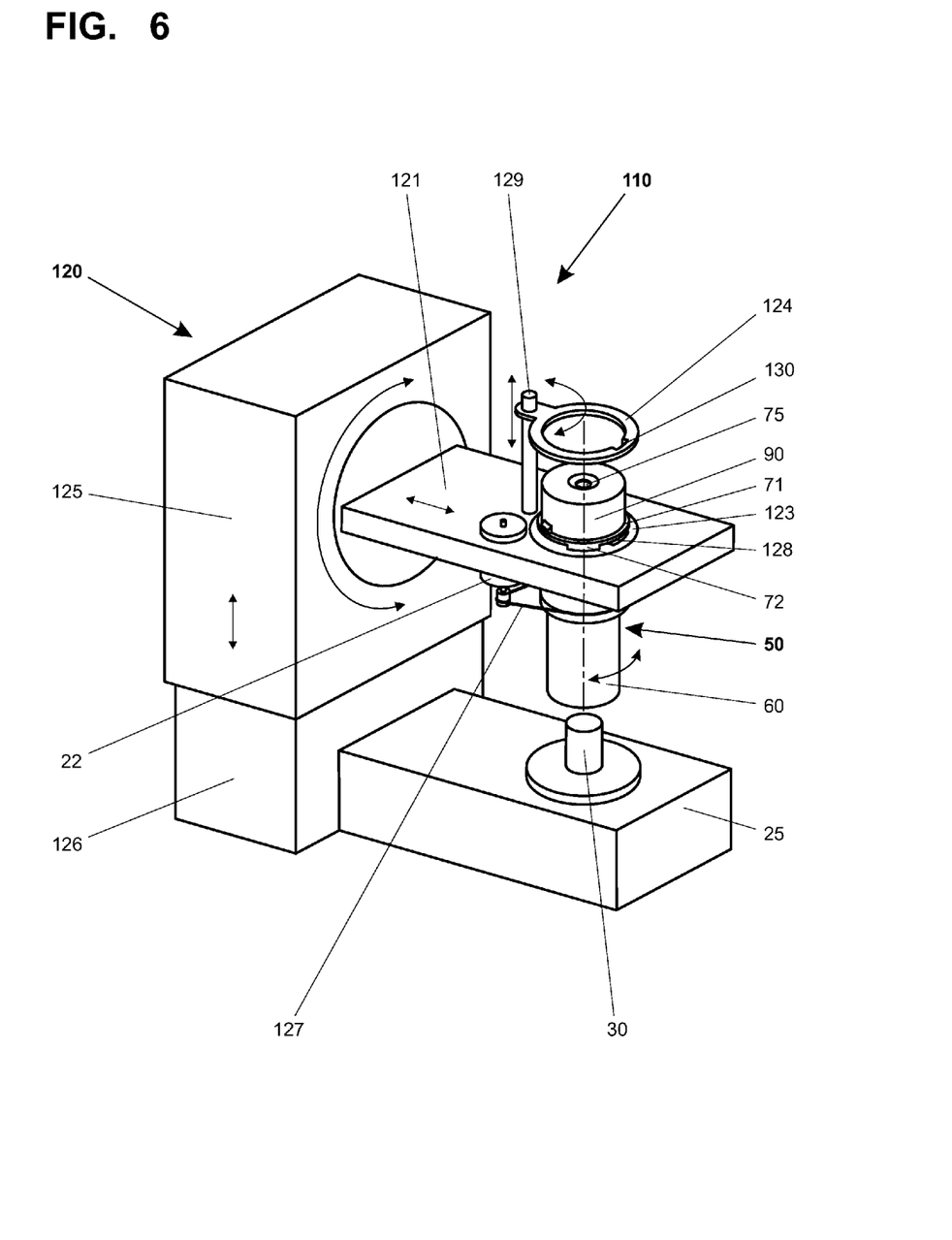
FIG. 6 is a schematic perspective view of a dosage-dispensing device with a dosage-dispensing unit, with a receiving device that can be tilted about a horizontal axis of rotation, and with a drive mechanism as well as with a balance including a weighing cell to measure the quantity of dosage material dispensed.

FIG. 6 presents a schematic three-dimensional view of a dosage-dispensing device 110 with a dosage-dispensing unit 50, wherein the dosage-dispensing device 110 includes a receiving device 121 and a drive mechanism 22 as well as a balance 25 with a weighing cell to measure the quantity of dosage material dispensed. The receiving device 121 is pivotally connected with the base unit 120 so as to be able to tilt about a horizontal axis of rotation. The first unit 123 is held rotatably in the receiving device 121 and connected through a belt 127 to a drive wheel of the drive mechanism 22 so as to allow rotary movement to be transmitted. The first unit 123 has a first recess 128 which is matched to the shape of the first means 72. As the double arrows indicate, the second unit 124 is designed so as to allow linear movement of the second unit 124 along a guide post 129 that is rigidly connected to the receiving device 121, as well as swivel movement of the second unit 124 about the guide post 129. Furthermore, the second unit 124 can also be locked into a fixed position on the guide post 129. The second unit 124 has a second recess 130 which is matched to the shape of the second means 92.

The dosage-dispensing device 110 as shown in FIG. 6 is not shown in ready-to-operate condition, but in the setup phase. In the setup phase, the dosage-dispensing unit 50 is set into the receiving device 121, more specifically into a round opening of the first unit 123. To bring the dosage-dispensing device 110 into the fully operative state, the ring-shaped second unit 124 is next swiveled into alignment with the dosage-dispensing unit 50 and lowered in linear movement along the guide post 129 until the aperture-setting member 90 passes through the second unit 124 and the latter is loosely resting on the second means 92. The second unit 124 can now be turned until the first means 72 seats itself in the first recess 128 and the second means 92 seats itself in the second recess 130. Next, the second unit 124 is locked in a fixed position on the guide post 129, and the receiving device 121 with the dosage-dispensing unit 50 is tilted upside down about a horizontal axis of rotation, so that the outlet opening 75 will be located directly above the inlet opening of the target container 30. Of course, as a way to loosen up the dosage material, the receiving device 121 can be tilted back and forth any number of times before the dispensing process is started. As is clearly evident from FIG. 6, the dosage-dispensing unit 50 is not opened and closed by turning the aperture-setting member 90 relative to the receiving device 121, but by turning the basic body 71 with the source container 60.

After the dosage-dispensing process, in order to remove the dosage-dispensing unit 50 for the receiving device 121, the foregoing steps are performed essentially in reverse order.

To allow target containers 30 of different heights to be used, the base unit 120 can be divided into a lower part 126 and an upper part 125, wherein for the height adjustment the upper part 125 can slide up and down on the lower part 126.

While the invention has been described through the presentation of a specific example of an embodiment, it is evident that numerous other variations of embodiments could be created once the present invention is known, for example a dosage-dispensing head with a plurality of connector areas for a plurality of source containers. A dosage-dispensing head could also have a plurality of outlet openings which can be closed with one slider for all of the outlet openings or with an individual slider for each outlet opening. It is further possible to add other elements to the dosage-dispensing head or the source container, for example means of identification such as bar codes, matrix codes and/or radio-frequency-based identification means (RFID tags). Also, there can be gas connector ports for the injection of protective inert gases into the dosage-dispensing unit, or chambers for desiccants can be formed in the source container and/or the dosage-dispensing head. Of course, the dosage-dispensing devices shown in FIGS. 5 and 6 represent only two possible, schematically outlined embodiments wherein the design details, for example of the guide post shown in FIG. 6, or the transfer of the torque from the drive mechanism to the dosage-dispensing unit, are left to the preference of the professional.

What is claimed is:

1. A head for dispensing a dosage of a free-flowing substance from a source container, the head comprising:
   a slider, comprising a passage opening and a guide strip;
   a body, comprising:
      an end surface;
      an outlet opening;
      an area adapted for coupling the body with the source container or a closure lid of the source container; and
      a groove, at least a partial section of which is offset parallel to itself, the offset being matched to the respective widths of the guide strip and the groove, to serve to guide the slider in a linear movement thereof; and
   an aperture-setting member, arranged on the body for rotation about a rotary axis that is orthogonal to the end surface, the rotary movement thereof serving to actuate the slider, the aperture setting member comprising an orifice opening, configured such that, for any position of the aperture-setting member relative to the body, the outlet opening falls within the area of the orifice opening, and, as the slider moves in a linear path relative to the body, the flow rate of free-flowing substance through the passage opening is regulated.

2. The head of claim 1, further comprising:
   an opposing surface of the aperture-setting member, arranged next to the end surface; and
   a recess of the aperture-setting member, set back from the opposing surface and serving to receive the slider, the recess having a central longitudinal axis arranged parallel to, and at a distance from, the rotary axis of the aperture setting member.

3. The head of claim 2, wherein:
   the body and the aperture-setting member comprise, respectively, a first and a second means for transmitting a torque.

4. The head of claim 3, further comprising:
   a limit stop; and
   an opposing stop, the respective stops arranged as a means for delimiting the range of rotation between the body and the aperture-setting member.

5. The head of claim 4, wherein:
   at least one of the passage opening and the outlet opening is a perforation having a circular, triangular or square profile.

6. The head of claim 1, wherein:
   the slider and the aperture-setting member comprise an electrically conductive material.

7. The head of claim 1, further comprising:
   a raised dam of the end surface, encircling the outlet opening.

8. The head of claim 7, further comprising:
   a sealing lip surrounding the outlet opening and formed on the raised dam.

9. A unit for dispensing a dosage of a free-flowing substance, comprising:
   a dosage-dispensing-head of claim 1; and
   at least one source container or closure lid, connected to the connector area of the dosage-dispensing head.

10. A device for dispensing a dosage of a free-flowing substance, comprising:
    a base unit;
    at least one receiving device arranged on the base unit;
    a dosage-dispensing unit of claim 9 corresponding to, and arranged on, each receiving device, the body and the aperture-setting member of the dosage dispensing head thereof comprising respective first and second means for transmitting a torque; and
    at least one drive mechanism;
    each receiving device further comprising a first unit corresponding to the first torque transmitting means; and
    each drive mechanism further comprising a second unit corresponding to the second torque transmitting means.

11. The device of claim 10, wherein:
    each receiving device is pivotally supported on the base unit for tilting about a horizontal tilt axis.

12. The device of claim 10, wherein:
    the first unit is arranged on the receiving device for rotation while being connected to the drive mechanism; and
    the second unit holds the dosage-dispensing unit and takes up the torque during the dosage-dispensing process.

13. The device of claim 10, wherein:
    the first unit is connected rigidly to the receiving device, holds the dosage-dispensing unit and takes up the torque during the dosage-dispensing process, and
    the second unit is connected rotatably to the drive mechanism.

14. The device of claim 10, wherein:
    the first unit and the first means and the second unit and the second means are, respectively, matched to each other for a form-fitting mutual engagement, the respective form-fitting matches designed such that completely installing the dosage-dispensing unit determines the only position that the body can take relative to the first unit and the only position that the aperture-setting member can take relative to the second unit.

15. The head of claim 4, further comprising:
a raised dam of the end surface, encircling the outlet opening.

16. The head of claim 15, further comprising:
a sealing lip surrounding the outlet opening and formed on the raised dam.

\* \* \* \* \*